(12) United States Patent
Kekki

(10) Patent No.: US 9,521,005 B2
(45) Date of Patent: Dec. 13, 2016

(54) ACCESS NETWORK SELECTION

(71) Applicant: Nokia Technologies Oy, Espoo (FI)

(72) Inventor: Sami Kekki, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/440,587

(22) PCT Filed: Nov. 6, 2012

(86) PCT No.: PCT/FI2012/051084
§ 371 (c)(1),
(2) Date: May 4, 2015

(87) PCT Pub. No.: WO2014/072569
PCT Pub. Date: May 15, 2014

(65) Prior Publication Data
US 2015/0288529 A1    Oct. 8, 2015

(51) Int. Cl.
*H04W 48/08* (2009.01)
*H04W 48/18* (2009.01)
*H04L 12/14* (2006.01)
*H04W 48/02* (2009.01)
*H04W 84/12* (2009.01)

(52) U.S. Cl.
CPC .......... *H04L 12/1407* (2013.01); *H04W 48/18* (2013.01); *H04W 48/02* (2013.01); *H04W 84/12* (2013.01)

(58) Field of Classification Search
CPC ........ H04W 4/02; H04W 4/021; H04W 4/025; H04W 4/027; H04W 8/18; H04W 36/26; H04W 36/32; H04W 40/20; H04W 48/02; H04W 48/04; H04W 48/08; H04W 48/16; H04W 48/18; H04W 64/00; H04W 84/12; H04W 15/61; H04L 12/1407; H04L 47/20; H04L 47/2408; H04L 63/0227; H04L 12/14
USPC .............. 370/310–350, 400–401; 455/414.1, 455/431–466
See application file for complete search history.

(56) References Cited

U.S. PATENT DOCUMENTS

| 8,824,315 B2 * | 9/2014 | Kokkinen | ............. H04W 24/00 370/252 |
| 2010/0281170 A1 * | 11/2010 | Rui | ..................... H04L 12/1407 709/227 |
| 2010/0284336 A1 * | 11/2010 | Rui | ........................ H04L 12/14 370/328 |

(Continued)

FOREIGN PATENT DOCUMENTS

| EP | WO 2013/029672 A1 * | 3/2013 | ............ H04W 48/16 |
| WO | 2010/091734 A1 | 8/2010 | |

(Continued)

OTHER PUBLICATIONS

International Search Report and Written Opinion received for corresponding Patent Cooperation Treaty Application No. PCT/FI2012/051084, dated Jul. 26, 2013, 10 pages.

(Continued)

*Primary Examiner* — Tri H Phan
(74) *Attorney, Agent, or Firm* — Harrington & Smith

(57) ABSTRACT

A method and apparatus for receiving access network selection information, and obtaining information about whether the received information complies with operator's access network selection policy.

19 Claims, 6 Drawing Sheets

(56) References Cited

U.S. PATENT DOCUMENTS

| | | | |
|---|---|---|---|
| 2010/0291923 A1* | 11/2010 | Zhou | H04L 12/1403 455/432.1 |
| 2011/0294435 A1* | 12/2011 | Miller | H04L 41/0893 455/67.11 |
| 2011/0317571 A1 | 12/2011 | Kokkinen et al. | |
| 2012/0033583 A1 | 2/2012 | Hu et al. | |
| 2012/0039175 A1 | 2/2012 | Sridhar et al. | |
| 2012/0102174 A1* | 4/2012 | Zhou | H04L 12/14 709/223 |
| 2012/0309447 A1* | 12/2012 | Mustajarvi | H04W 48/18 455/524 |
| 2013/0143542 A1* | 6/2013 | Kovvali | H04W 48/18 455/418 |
| 2014/0160994 A1* | 6/2014 | Garcia Martin | H04W 48/16 370/259 |
| 2015/0282058 A1* | 10/2015 | Forssell | H04W 48/18 455/552.1 |

FOREIGN PATENT DOCUMENTS

| | | |
|---|---|---|
| WO | 2011082833 | 7/2011 |
| WO | 2012/040247 A1 | 3/2012 |
| WO | 2012038911 | 3/2012 |
| WO | 2012/075323 A1 | 6/2012 |
| WO | 2012092935 | 7/2012 |

OTHER PUBLICATIONS

"3rd Generation Partnership Project; Technical Specification Group Services and System Aspects; Policy and charging control architecture (Release 11)", 3GPP TS 23.203, V11.7.0, Sep. 2012, pp. 1-178.

"3rd Generation Partnership Project; Technical Specification Group Services and System Aspects; Architecture enhancements for non-3GPP accesses (Release 11)", 3GPP TS 23.402, V11.4.0, Sep. 2012, pp. 1-252.

Copeland et al., "Policies to Enable Serving Untrusted Services on Alternative (Non-3GPP) and Untrusted Access Networks in EPS", IEEE 35th Annual Computer Software and Applications Conference Workshops, Jul. 18-22, 2011, pp. 48-53.

"Policy Server (PCRF)", Tekelec, Retrieved on Oct. 29, 2012, Webpage available at : http://www.oracle.com/us/corporate/acquisitions/tekelec/index.html.

Extended European Search Report received for corresponding European Patent Application No. 12888100.0, dated Mar. 31, 2016, 9 pages.

"Policy Based Terminal Triggered, ANDSF Decided Access Selection", 3GPP TSG SA WG2 Architecture—S2#63, S2-081658, Agenda: 8.1.5, Alcatel-Lucent, Feb. 18-22, 2008, 6 pages.

* cited by examiner

ACCESS NETWORK SELECTION

RELATED APPLICATION

This application was originally filed as PCT Application No. PCT/FI2012/051084 filed Nov. 6, 2012.

TECHNICAL FIELD

The invention generally relates to wireless network technologies and access network selection policies. More specifically, but not exclusively, the invention relates to non-3GPP accesses, such as WLAN access, to 3GPP evolved packet switched domain.

BACKGROUND

Access network selection policies are used by the network operator to steer its users between different wireless access networks. In a typical scenario, end user devices are provided with access network selection policies as guidance to the devices to find the most preferred access network for their needs. The most preferred access network may also be dependent on the service. The users of the devices may comply with the guidance or overrule it.

SUMMARY

According to a first example aspect of the invention, there is provided a method comprising:
  receiving access network selection information; and
  obtaining information about whether the received information complies with operator's access network selection policy.

In this way it is possible to allow the network operator (or cellular network operator) to monitor its subscriber's adherence to the access network selection policy, and to react accordingly. An access network selection policy may be coupled to a policy control function to control the subscriber's adherence to the access network selection policy. In the context of LTE networks or 3GPP evolved packet system (EPS) (3GPP packet switched domain, or 3GPP evolved packet core (EPC)), for example, this may mean that an access network selection policy is coupled to a policy control and charging functionality (PCC). In 3GPP evolved system a Policy and Charging Rules Function element (PCRF), Policy and Charging Enforcement Function (PCEF) or similar implements this functionality.

A user equipment (UE), which may be for example a mobile UE, a mobile node (or a mobile handset) may use an access network to get connectivity to a desired network to use network or core network services and/or to access the internet. The desired network may be a packet switched core network, for example, 3GPP evolved core network (e.g., EPC).

The access network selection information is received in an apparatus. The apparatus may be an apparatus or device implementing policy control and charging functionality. The apparatus may be an electronic device.

The access network selection information may be received at the time of or during connection or session creation (or establishment). The connection or session here means a connection or session created (or to be created) for the user equipment to get connectivity, such as IP connectivity, to the desired network.

The access network selection policy may be dependent on the service in question, such as, the service requested by the user equipment. And/or, the access network selection policy may be dependent on the type (or other characteristics) of the service in question, such as, the type of the service requested by the user equipment. Accordingly, in certain example embodiments, the access network selection information comprises information indicating (or identifying) the service in question (requested service). And/or, the access network selection information comprises information indicating (or identifying) the type of service in question (requested service). The information indicating (or identifying) the service or service type in question may be a service identifier or service type identifier, respectively, or similar. Services or service types, depending on their definition, may be, for example, voice services and data services. Further, services or service types, depending on their definition, may be, for example best effort data services and guaranteed QoS services, etc. If the service (or service type) is comprised by the access network selection information, the feature of the presented method of obtaining information about whether the received information complies with operator's access network selection policy may be performed service dependent. The service may be directly or indirectly indicated. Direct indication uses an identifier which directly tells the service in question. Indirect indication uses an indicator based on which the service can be deduced. Examples of indirect indicators are IP flow definitions, such as an IP address and/or port information (or port number). A further example is an access point name (APN) in certain embodiments.

Accordingly, in certain example embodiments, there is provided a method, wherein the access network information comprises information indicating the service in question.

And, in certain example embodiments, the method comprises:
  obtaining information about whether the received information complies with operator's access network selection policy concerning the service in question.

In certain example embodiments, the access network selection information comprises information identifying the access network type (such as, cellular or WLAN). In a more general case, the access network type may be separated between cellular and non-cellular access, or between 3GPP access and WLAN or 3GPP access and non-3GPP access especially in the case of 3GPP evolved system. In certain example embodiments, the access network selection information may identify the access network. It may contain an access network identifier. This may be in addition to the access network type. In certain example embodiments, the access network selection information comprises location information of the access network or of the user equipment in question. In certain example embodiments, the information identifying the access network may also be location information. The information identifying the access network or the location information may, depending on the access network, contain the name of the access network (such as SSID or HESSID of a WLAN), an access point ID (such as a WLAN access point ID or WLAN access point MAC address; or cell ID, visited network ID, tracking area ID or serving area ID in the event of cellular access). And/or the information may contain the geographical location of the access point (AP) in question.

In certain example embodiments, the apparatus or a policy and charging control entity such as the PCRF or similar therein receives the access network selection information from a gateway. The gateway may be the gateway that is handling the session creation (or connectivity request from the user equipment).

In certain example embodiments, the method comprises:
receiving said access network selection information in response to asking.

The policy and charging control entity such as the PCRF or similar may ask the access network selection information from the gateway. In other embodiments, an alternative source for the access network selection information is an authentication, authorization and accounting (AAA) server that is taking care of the authentication of the UE concerned. A concerned network gateway (for example, a PDN Gateway in EPS) can query the AAA server and forward the received information (target AP name or similar) to the PCRF. Accordingly, the PCRF or similar may receive the access network selection information from the AAA server. It may receive it via another network node.

In certain example embodiments, the method comprises:
obtaining said information about whether the received information complies with operator's access network selection policy by querying from a policy repository.

The compliance check (that is, the obtaining said information) is performed by the apparatus. Accordingly, the PCRF or similar may query the compliance from the policy repository. The policy repository may be, for example, a locally replicated access network selection policy database in the PCRF or similar element, or the policy storage or database maintained in the network, or it can be an access network discovery and selection function (ANDSF) server.

The feature of obtaining said information about whether the received information complies with operator's access network selection policy may contain verifying the received access network selection information against network operator's access network selection policy.

In certain example embodiments, the method comprises reacting, by the apparatus, to access network selection in the event of non-compliance with the policy. Accordingly, the method comprises:
performing policy enforcement concerning a session in question which is being created, based on compliance check with the policy.

In certain example embodiments, the network applies different charging in case of non-compliance. In certain example embodiments, the network applies reduced or modified bit rate. In certain example embodiments, the network applies different or degraded QoS for the session. In certain example embodiments, the network rejects the connectivity request concerned altogether. Said functions may be implemented by the PCRF or similar. In yet further example embodiments, the information about the compliance may be logged for operation and maintenance purpose, for example, to be used later in network coverage and capacity planning.

The access network selection information may be access network selection information of non-cellular access (non-3GPP or WLAN access in the EPS).

In certain example embodiments, the method comprises sending a result of verification towards the UE. The UE may a mobile UE.

Accordingly, in certain example embodiments, the method comprises sending the outcome concerning compliance with the policy towards a user equipment.

The outcome may be sent to a gateway. The gateway may be the same gateway from which the access network selection information was first received (the gateway handling session creation). The PRCF or similar may send the outcome to the gateway. The outcome may be sent in a message with an additional cause code. The cause code may indicate approval of the session which is being created between the UE and the network due to compliance with the access network selection policy. Or the cause code may indicate modification or rejection of the session concerned due to non-compliance with the access network selection policy. The cause code may include information intended for the user equipment and for the end user. In certain example embodiments, such information is then forwarded to the user equipment by the gateway.

Accordingly, in certain example embodiments, said policy enforcement comprises modifying or rejecting the session.

In certain example embodiments, the compliance/non-compliance information is sent to the UE. When the user equipment receives the information from the network about its adherence (or the lack of it) to the network operator's access selection policy, the end user can be notified accordingly via the user interface of the device.

As mentioned, in certain example embodiments, the access network selection information comprises location information.

In certain example embodiments, the method comprises:
performing location-dependent policy enforcement concerning the session in question based on compliance check with the policy.

In certain example embodiments, the method comprises:
having access networks in a priority list, and accepting, modifying or rejecting the session in question based on what access network contained in the list the user equipment is using (or is attempting or intending to use).

In certain example embodiments, a system is provided that verifies that a configured node behaves as configured. In certain example embodiments, the means for doing that are in an EPC environment the PCRF requesting ANDSF to check for compliance, and ANDSF checking the compliance. Results may be communication (together with approval "OK" or failure codes) towards the UE. For example Non-Access Stratum (NAS) signaling may be used. The UE may inform results and any implications to the end user.

In certain example embodiments, the signaling from the access network to the gateway (handling session creation for user equipments) and from the gateway to the PCRF contains WLAN AP information and the information about the type or other characteristics of the service requested by the user equipment (in session establishment). This information is further transferred over an interface between the PCRF and ANDSF to check the subscriber's adherence to the network operator's access network selection policy.

According to a second example aspect of the invention, there is provided an apparatus comprising:
at least one processor; and
at least one memory including computer program code
the at least one memory and the computer program code configured to, with the at least one processor, cause the apparatus to perform at least the following:
receiving access network selection information; and
obtaining information about whether the received information complies with operator's access network selection policy.

In certain example embodiments, the apparatus comprises the at least one memory and computer program code configured to, with the at least one processor, cause the apparatus to perform the method as defined by the first example aspect or any of its embodiments.

According to a third example aspect of the invention, there is provided an apparatus comprising:
- a communication interface configured to receive access network selection information; and
- a first processor configured to obtain information about whether the received information complies with operator's access network selection policy.

In certain example embodiments, the access network information comprises information indicating the service in question.

In certain example embodiments, the apparatus is configured to obtain information about whether the received information complies with operator's access network selection policy concerning the service in question.

In certain example embodiments, the apparatus is configured to receive said access network selection information in response to asking.

In certain example embodiments, the apparatus is configured to obtain said information about whether the received information complies with operator's access network selection policy by querying from a policy repository.

In certain example embodiments, the apparatus is configured to send the outcome concerning compliance with the policy towards a user equipment.

In certain example embodiments, the apparatus is configured to perform policy enforcement concerning a session in question which is being created, based on compliance check with the policy.

In certain example embodiments, the policy enforcement comprises modifying or rejecting the session. Said modification of the session may contain modification of the session characteristics, for example, bandwidth and/or QoS.

In certain example embodiments, the access network selection information comprises location information.

In certain example embodiments, the apparatus is configured to perform location-dependent policy enforcement concerning the session in question based on compliance check with the policy.

In certain example embodiments, the policy repository has access networks in a priority list, and the apparatus is configured to accept, modify or reject the session in question based on what access network contained in the list the user equipment is using.

According to a fourth example aspect of the invention, there is provided an apparatus comprising:
- a communication interface configured to receive network selection access policy compliance information; and
- a user interface configured to display the received network selection access policy compliance information.

The compliance information may indicate or show the compliance as such. Alternatively, or in addition, the information may contain a suggestion to use a different (or another more preferred) access network, e.g., for better service experience or for lower cost of use. An end used may thus be encouraged to select the most preferred access network (from the end user's point of view). The "compliance information as such" may indicate whether the intended access network attempted to be used to get connectivity for the desired service or to the desired (core) network or internet complies with the (core) network operator access network selection policy. The compliance information may comprise an implication in case of non-compliance, for example, different charging, reduced or modified bit rate, and/or a suggestion to select another access network. This may be, for example, for better quality of experience, for lower cost, etc.

Accordingly, in certain example embodiments, the network selection access policy compliance information comprises a suggestion for an end user to select another access network.

The apparatus of the fourth example aspect may be a user equipment. It may be a mobile node or a mobile station.

According to a fifth example aspect of the invention, there is provided a computer program, comprising:
(program) code for performing a method as defined by the first example aspect or any of its embodiments, when the computer program is run on a processor.

According to a sixth example aspect of the invention, there is provided a memory medium comprising the computer program of the fifth example aspect.

Any memory medium hereinafter or hereinbefore may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory, polymer memory or any combination thereof. The memory medium may be formed into a device without other substantial functions than storing memory or it may be formed as part of a device with other functions, including but not limited to a memory of a computer, a chip set, and a sub assembly of an electronic device.

According to a seventh example aspect of the invention, there is provided a system comprising
- an apparatus according to the second or third example aspect or any of their embodiments; and
- an apparatus according to the fourth example aspect or any of its embodiments.

According to yet another example aspect of the invention, there is provided an apparatus comprising:
- means for receiving access network selection information; and
- means for obtaining information about whether the received information complies with operator's access network selection policy.

Different non-binding example aspects and example embodiments of the present invention have been illustrated in the foregoing. The foregoing example embodiments are used merely to explain selected aspects or steps that may be utilized in implementations of the present invention. Some example embodiments may be presented only with reference to certain example aspects of the invention. It should be appreciated that corresponding example embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Example embodiments of the present invention and their potential advantages are understood by referring to FIGS. 1 through 7 of the drawings.

Figure 1:
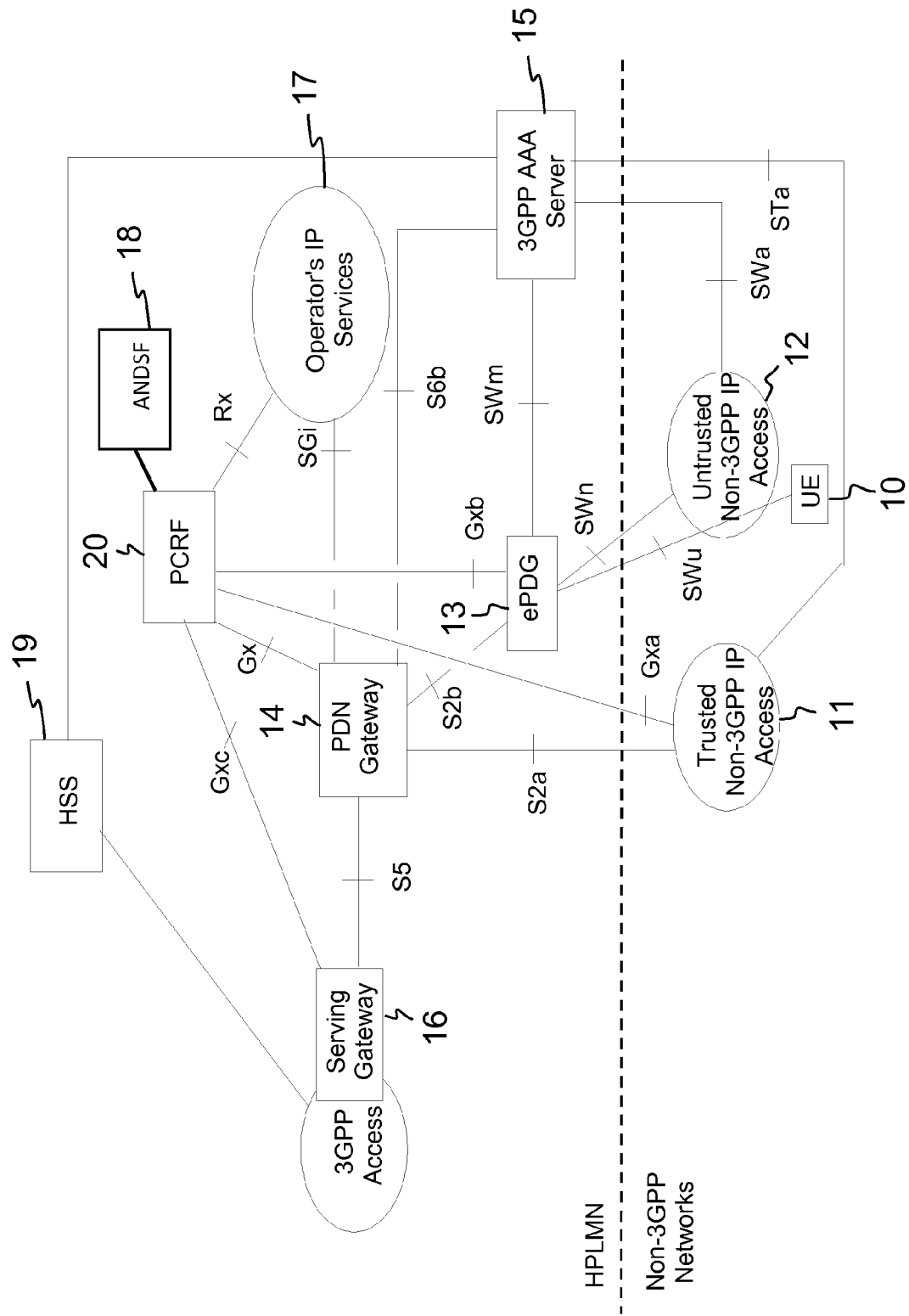
FIG. 1 shows a first system architecture of 3GPP evolved system for non-3GPP IP access scenarios according to an example embodiment.

FIG. 1 shows a first system architecture of 3GPP evolved system for IP access scenarios according to an example embodiment. The system provides IP connectivity using either cellular access (3GPP access) or non-3GPP accesses to the evolved 3GPP packet switched domain. In the following, WLAN access scenarios are used as an example of non-3GPP IP access scenarios. In the example shown in FIG. 1 network based mobility is assumed.

The system architecture is divided between Home Public Land Mobile Network (HPLMN) and Non-3GPP networks. The mobile user equipment UE 10 is provided with either trusted or untrusted WLAN access to the cellular network (HPLMN). The interface between a trusted WLAN access network or access point 11 and a 3GPP AAA (Authentication, Authorization and Accounting) server 15 is defined as STa interface. The interface between an untrusted WLAN access network or access point 12 and the 3GPP AAA server 15 is defined as SWa interface.

On the HPLMN side the 3GPP evolved system comprises, in addition to the 3GPP AAA server 15, an evolved Packet Data Gateway (ePDG) 13, a Packet Data Network Gateway (PDN Gateway) 14, a Serving Gateway 16, a Home Subscriber Server (HSS) 19, and a Policy and Charging Rules Function element (PCRF) 20. The interface between ePDG 13 and 3GPP AAA server 15 is defined as SWm interface, the interface between ePDG 13 and PDN Gateway 14 as S2b interface, the interface between ePDG 13 and PCRF 20 as Gxb interface, the interface between ePDG 13 and UE 10 as SWu interface, and the interface between ePDG 13 and untrusted WLAN access network or access point 12 as SWn interface. The interface between PDN Gateway 14 and 3GPP AAA server 15 is defined as S6b interface, the interface between PDN Gateway 14 and Serving Gateway 16 as S5 interface, the interface between PDN Gateway 14 and PCRF 20 as Gx interface, the interface between PDN Gateway 14 and operator's IP services 17 as SGi interface, and the interface between PDN Gateway 14 and trusted WLAN access network or access point 11 as S2a interface. The interface between PCRF 20 and Serving Gateway 16 is defined as Gxc interface, the interface between PCRF 20 and operator's IP services 17 as Rx interface, and the interface between PCRF 20 and trusted WLAN access network or access point 11 as Gxa interface. The PCRF 20 further has a communication interface towards an Access Network Selection and Discovery Function (ANDSF) server 18.

Figure 2:
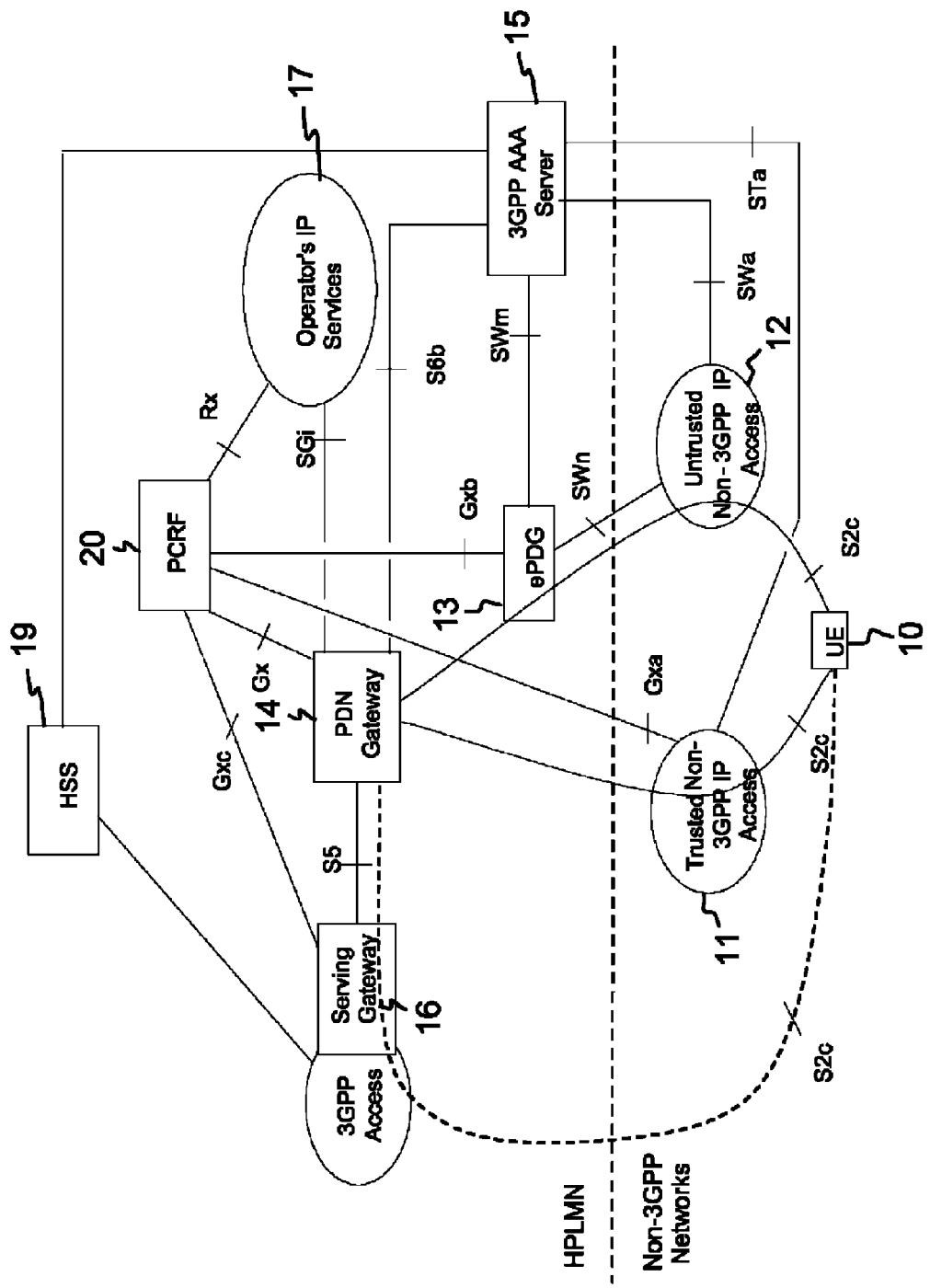
FIG. 2 shows a second system architecture of 3GPP evolved system for non-3GPP IP access scenarios according to an example embodiment.

FIG. 2 shows a second system architecture of 3GPP evolved system for IP access scenarios according to an example embodiment. In the example shown in FIG. 2 client based mobility is assumed. IP Mobility signaling is used between the UE 10 and the network Gateway (PDN Gateway) 14 that is acting as a home agent (HA).

The interfaces between different elements and functions are mainly the same as in FIG. 1. The interface between PDN Gateway 14 and UE 10 either via the ePDG 13 and untrusted WLAN access network or access point 12, or via the trusted WLAN access network or access point 11, or via the Serving gateway 16 and 3GPP access is defined as S2c interface.

In the following, an example embodiment in which the UE attempts to get connectivity from the network is described. At the time when the UE attempts to get connectivity from the network, that is, to create a session with the network, either through the cellular access or through the non-3GPP access, a policy and charging control (PCC) infrastructure is used to check the compliancy of the UE's selected access network against the relevant access network selection policy or policies. In order to do that, the PCRF element requests from the gateway that is handling the connectivity request (session creation), if not available in the original session creation signaling, the WLAN Access Point ID or the WLAN Access Point MAC address, or the cell ID, or any other equivalent information that can be used to identify the access network the UE is using. This information is generally denoted as access network selection information.

Optionally, also the location of the AP or of the device (UE) is requested. Once the PCRF gets the target AP/cell ID, it checks either from the locally replicated access selection policy database or from the Access Network Selection and Discovery Function server (ANDSF) or an equivalent policy repository in the network whether the UE in question is using the intended access network type (cellular, WLAN), the access network, the WLAN Access Point, or if the UE is using a non-compliant access network instead.

If the UE is following the policy then the session creation is completed normally. If the UE appears to use an access that is not according to the access selection policy, the PCRF can apply different charging, can apply reduced or modified bit rate or different, degraded QoS or the PCRF can reject the connectivity request. The Gx interface provides transfer of enforcement policies, such as QoS policy, and charging rules from PCRF 20 (FIGS. 1 and 2) to a policy and charging enforcement function (PCEF) in the PDN GW 14 (FIGS. 1 and 2).

Additionally, the gateway can be informed of the outcome, with the appropriate cause code at least in case of rejection.

The gateway (13 or 14 in FIGS. 1 and 2) can then signal down to the access network (11 or 12 in FIGS. 1 and 2) this information. The information about the session creation or its rejection can reach the UE by using WLAN specific signaling, e.g. in EAP signaling. If the gateway is in the role of a Home Agent and is using Mobile IP signaling, it can use that signaling to directly inform the UE (Mobile Node) of the outcome (Mobile IP, IKEv2, or equivalent). On the cellular network side if the policy compliancy check indicates non-compliancy, e.g., the Protocol Configuration Option IE can be used by the gateway to inform the UE via Non-Access Stratum signaling (NAS).

If the UE receives the information from the network about its adherence (or the lack of it) to the network operator's access selection policy, the end user should then be notified accordingly via the user interface. This is primarily to make the end user aware of the possible charging or other implications. If the UE is not following the operator's access selection policy, the most likely reason for it is that the end user configuration has overruled the operator policies.

The information received by the UE may indicate or show the compliance as such. Alternatively, or in addition, the information may contain a suggestion to use a different (or another more preferred) access network, e.g., for better service experience or for lower cost of use. An end used may thus be encouraged to select the most preferred access network (from the end user's point of view). The "compliance information as such" may indicate whether the intended access network attempted to be used to get connectivity for the desired service complies with the network operator's access network selection policy. The compliance information may comprise an implication in case of non-compliance, for example, different charging, reduced or modified bit rate, and/or a suggestion to select another access network. This may be, for example, for better quality of experience, for lower cost, etc.

An alternative source for the access network selection information (e.g., WLAN AP) is the AAA server that is taking care of the authentication of the UE. The network gateway (for example PDN gateway 14) can query the AAA server for the target AP and forward that information to the PCRF.

Nature of the optional location information used by the PCRF can be the geographic location of the access point or of the UE, the visited network ID, the Tracking Area ID or the Serving Area ID or equivalent on the cellular access side. On WLAN side the location information can be the MAC address of the AP, the name of the WLAN (SSID or HESSID) or equivalent. In addition or alternatively the access network type (WLAN, cellular) alone can serve as a key in compliancy check.

In case of WLAN access network the optional location information can be conveyed from the access network to the gateway node in PMIP signaling or in GTP signaling. Between the gateway node 11 and the PCRF 20 a Gx-type of interface is used. As shown in FIG. 2, the Gxa interface can be used for PCRF 20 to download enforcement policies (such as QoS policy) to the WLAN gateway element 11. This interface can be used for checking the compliance with the access network selection policy. For EPC routed sessions Gx can be used for the same, as mentioned in the preceding.

The PCRF may use the target information directly in those cases where the access network selection policy relies on the same information. Alternatively the received information may need to be mapped to the appropriate ID used in the access network selection policy. As an example, the MAC address of the WLAN Access Point can be mapped to the network ID (SSID, HESSID) used by the given AP.

The gateway used as a policy enforcement point can be the PDN Gateway 14, or a evolved Packet Data Gateway (ePDG) 13 or a Home Agent node in cases where the session is for Evolved Packet Core (EPC) services via a non-3GPP access node, or it can be the Serving GPRS Gateway or Serving Gateway (SGW) 16 in case the UE device 10 is using cellular access (FIGS. 1 and 2).

Figure 3:
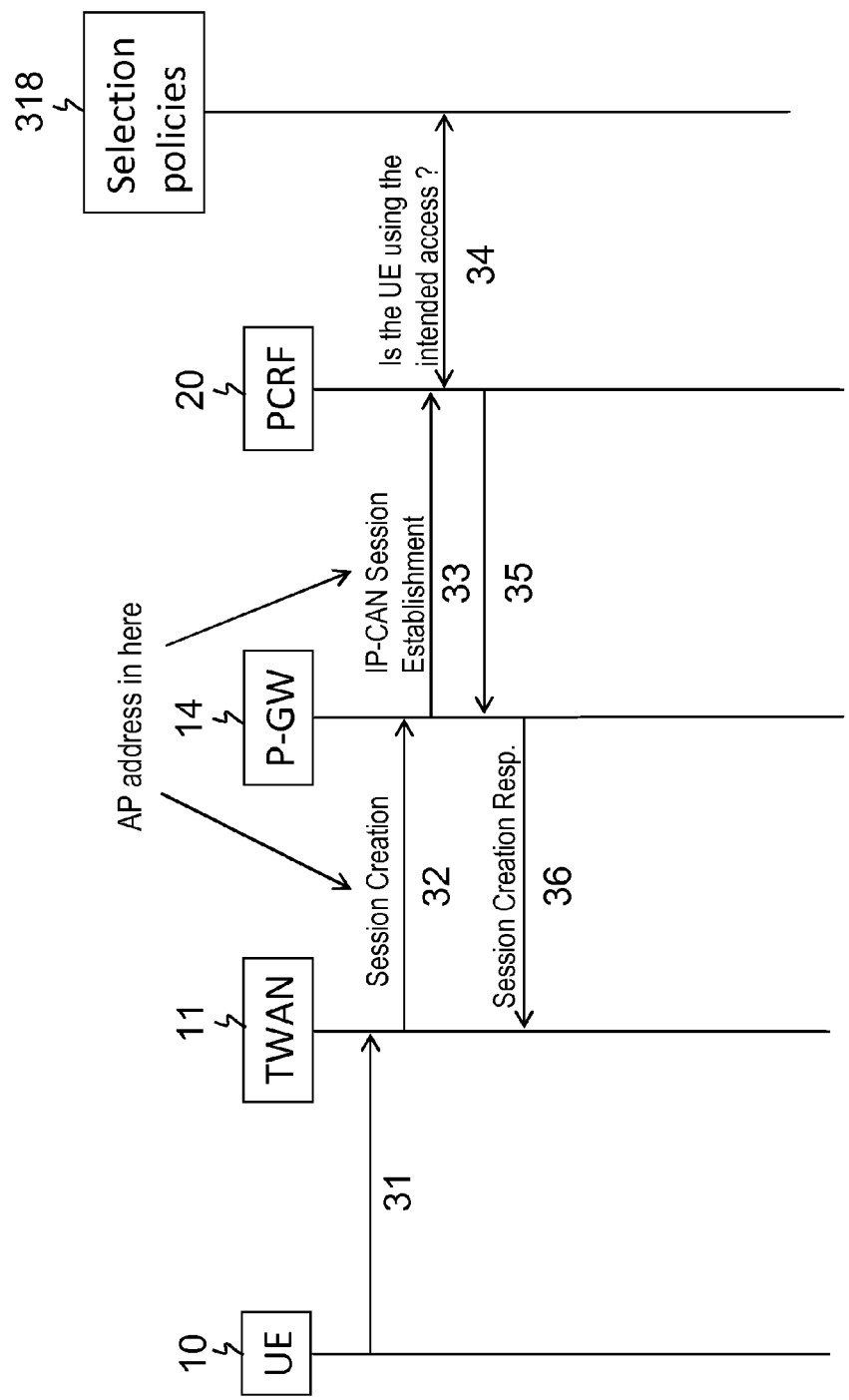
FIG. 3 shows a messaging architecture according to an example embodiment.

FIG. 3 shows a messaging architecture according to an example embodiment. More specifically, FIG. 3 shows an example embodiment where the UE 10 requests connectivity and the network checks whether the UE 10 has selected the access network according to the access network selection policy (that is, whether the selected access network complies with the network operator's access network selection policy).

The UE 10 attempts to create a session with the evolved Packet Core Network via a trusted WLAN Access Network (TWAN) 11. The UE 10 first sends an initiation message or signal 31 to TWAN 11. The TWAN 11 includes the WLAN AP address into a session creation message 32 and sends the message to the PDN Gateway (P-GW) 14. The P-GW 14 sends an IP-CAN Session Establishment message 33 over the Gx interface (FIGS. 1 and 2) to the PCRF 20. The PCRF 20 checks 34 with an access network selection policy repository 318 in the network whether the UE 10 in question is using the intended access. The outcome is sent by the PCRF 20 to the P-GW 14 in message 35 over the Gx interface. The outcome is further sent in a session creation response 36 by the P-GW 14 to the access network (TWAN) 11 over the S2a interface.

Figure 4:
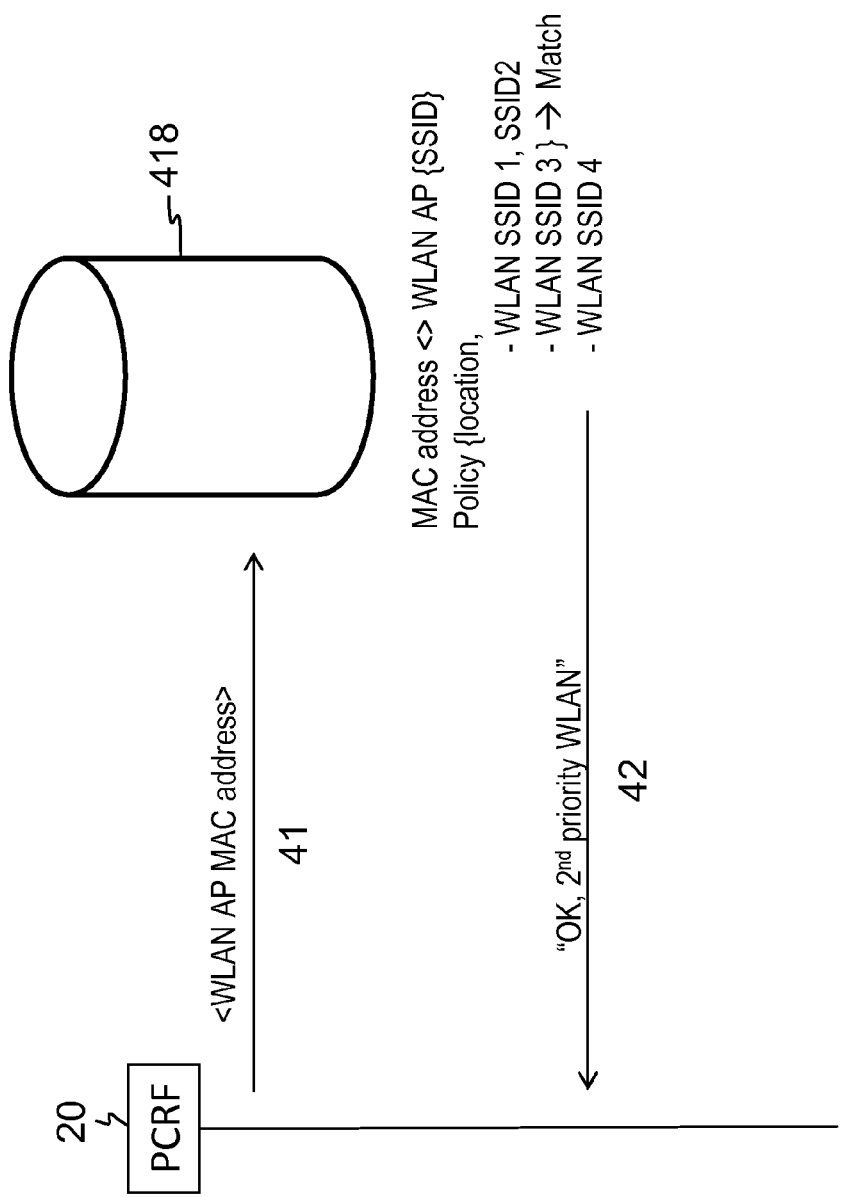
FIG. 4 shows a policy check procedure according to an example embodiment.

FIG. 4 shows a policy check procedure according to an example embodiment. In this example, the PCRF 20 uses the MAC address of the access network AP (WLAN AP) and the location information of the access network AP in querying 41 the policy database 418. The MAC address of the AP is resolved to find the SSID(s) that the given AP is advertising. Once the SSID is known, the following check is made against the access network selection policy: When in the given location, what is the most preferred WLAN SSID to be used. It is noteworthy that in the database there may be more than one WLAN available in the given location and those WLANs may be in the preferential order. After the check the PCRF 20 may have learnt that the UE 10 is not attached to the most preferred AP but to one of the less preferred ones. This is also the case in the example shown in FIG. 4 in which the matching SSID 3 in the location in question is only a $2^{nd}$ priority WLAN as illustrated in a response 42 to the query 41. This (the fact that the access network is a lower priority network in the given location) may result in some access/bandwidth/QoS restrictions or different charging for the UE.

The most preferred access network may also be dependent on the service (or type of service). More generally, the access network selection policy may be dependent on the requested service (instead or in addition to the fact that the access network selection policy may be dependent on the location of the access network or UE). As an example, for a voice service the most preferred access network may be a first WLAN network, while for a best effort data connection the most preferred access network may be another WLAN network, both available at the same geographical location. In other words, the access network selection policy may be dependent on the service in question, such as, the service requested by the user equipment. And/or, the access network selection policy may be dependent on the type (or other characteristics) of the service in question, such as, the type of the service requested by the user equipment. Accordingly, in certain example embodiments, the access network selection information comprises information indicating the service in question. And/or, the access network selection information comprises information indicating the type of service in question (requested service). The information indicating the service or service type in question may be a service identifier or service type identifier, respectively, or similar. Services or service types, depending on their definition, may be, for example, voice services and data services. Further, services or service types, depending on their definition, may be, for example best effort data services and guaranteed QoS services, etc. If the service (or service type) is comprised by the access network selection information, the feature of the presented method of obtaining information about whether the received information complies with operator's access network selection policy may be performed service dependent. Accordingly, in the embodiments shown in FIGS. 3 and 4, the signals or messages containing access network selection information, may contain, in addition to the information indicating or identifying the access network or access point in question, also information indicating or identifying the service in question. The check against operator's access network selection policy is (or may then be) performed taking the service in question (that is, the requested service) into account. The service may be directly or indirectly indicated. Direct indication uses an identifier which directly tells the service in question. Indirect indication uses an indicator based on which the service can be deduced. Examples of indirect indicators are IP flow definitions (such as IP addresses and/or port information (or port numbers)), and access point names (APN) in certain embodiments.

Figure 5:
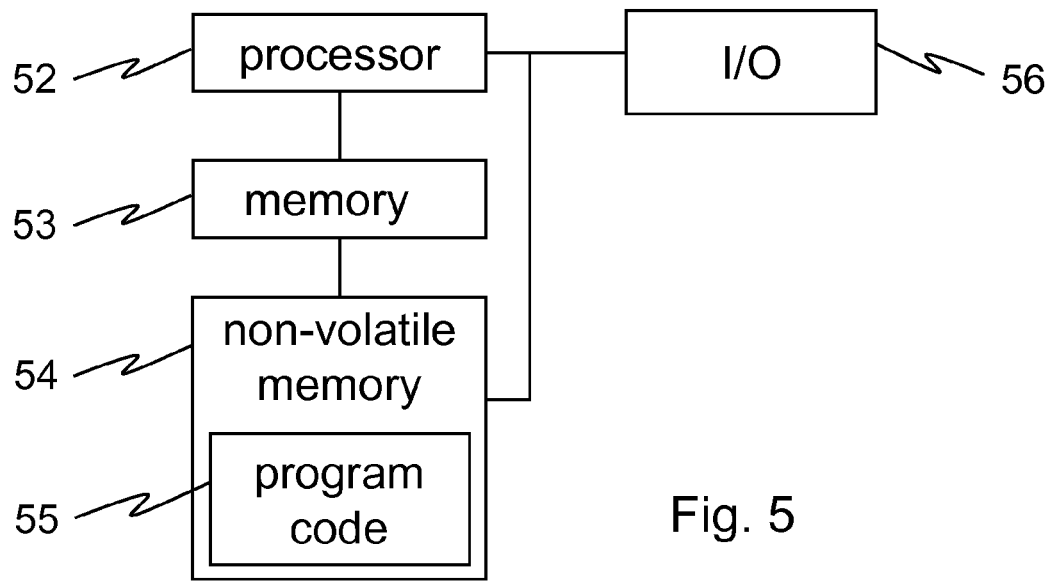
FIG. 5 shows an example block diagram of an apparatus according to an example embodiment.

FIG. 5 shows an example block diagram of an apparatus 50 according to an example embodiment. The apparatus 50 comprises at least one non-volatile memory 54 configured to store computer programs or software comprising computer program code 55. The apparatus 50 further comprises at least one processor 52 for controlling the operation of the apparatus 50 using the computer program code 55, a work memory 53 for running the computer program code 55 by the at least one processor 52, and an input/output system 56 for communicating with other entities or apparatuses. Accordingly, the input/output system 56 comprises one or more communication units or modules providing communication interfaces towards other entities and/or apparatuses. The apparatus 50 is configured to receive access network selection information via the input/output system 56. The apparatus is further configured to locally maintain operator's access network selection policies in its non-volatile memory 54 and to check received access network selection information against the access network selection policies, or if the access network selection policies are maintained elsewhere, the apparatus is configured to send appropriate queries via the input/output system 56. The apparatus is further configured to send enforcement policies and/or charging rules towards the UE via the input/output system 56.

Figure 6:
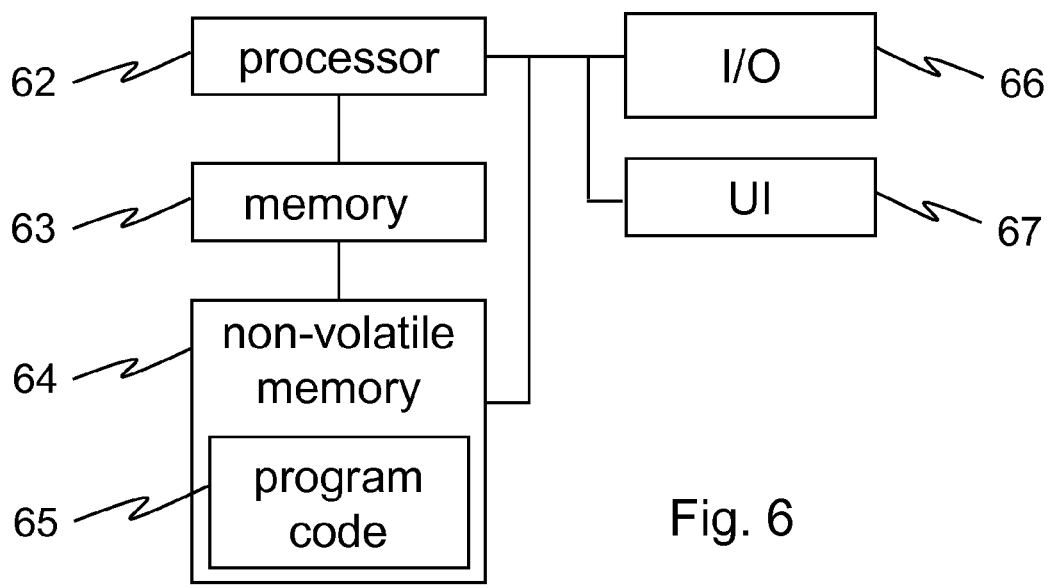
FIG. 6 shows an example block diagram of an apparatus according to another example embodiment.

Depending on the implementation, the structure of the apparatus 50 may deviate from that presented in FIG. 6. One or more of the blocks may be omitted and/or one or more additional blocks may be added in an actual implementation.

FIG. 6 shows an example block diagram of an apparatus 60 according to an example embodiment. The apparatus 60 comprises at least one non-volatile memory 64 configured to store computer programs or software comprising computer program code 65. The apparatus 60 further comprises at least one processor 62 for controlling the operation of the apparatus 60 using the computer program code 65, a work memory 63 for running the computer program code 55 by the at least one processor 62, and an input/output system 66 for communicating with other entities or apparatuses. Accordingly, the input/output system 66 comprises one or more communication units or modules providing communication interfaces towards other entities and/or apparatuses in a network. The apparatus 60 is configured to receive network selection access policy compliance information via the input/output system 66. The apparatus further comprises a user interface 67 configured to display the received network selection access policy compliance information for an end user. The apparatus 60 may be a user equipment. It may be a mobile device.

Figure 7:
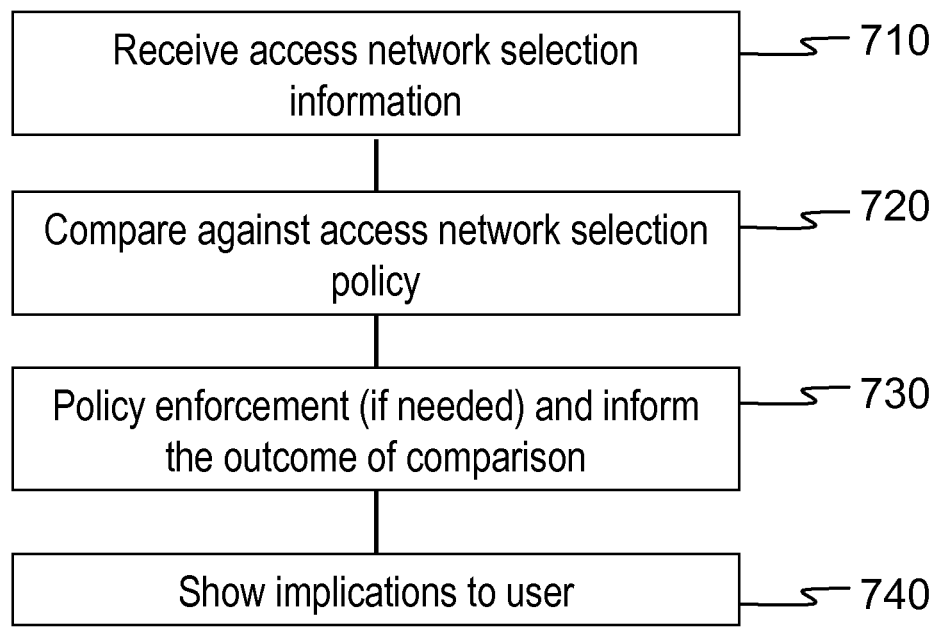
FIG. 7 shows a flow diagram of a method according to an example embodiment.

FIG. 7 is a flow diagram showing a method in accordance with an example embodiment. In step 710, access network selection information is received. In step 720, the received access network selection information is compared against access network selection policy/policies. In step 730, the outcome of comparison is sent towards the UE and policy enforcement is performed (in the event of non-compliance). In step 740, the non-compliance and implications are shown to the end user.

Without in any way limiting the scope, interpretation, or application of the appended claims, a technical effect of one or more of the example embodiments disclosed herein is allowing the mobile network operator to monitor the adherence of his subscribers to the offloading policies, such as WLAN offloading policies. A further technical effect is allowing the mobile network operator to react to any non-compliance via charging or via granting different bit rate or QoS resources to the subscriber. Another technical effect is providing the network operator with the possibility to check the compliancy at the time of granting the access to its subscriber. Another technical effect is providing for the network to check whether the end user has overruled the policy and to react in the event on non-compliance (enforce the policy), e.g. by blocking the access or by charging differently or by allowing only restricted access in terms of bandwidth or destinations.

It will be understood that each operation of the flowchart, and/or combinations of operations in the flowchart can be implemented by various means. Means for implementing the operations of the flowchart, combinations of the operations in the flowchart, or other functionality of the example embodiments described herein may comprise software, hardware, application logic or a combination of software, hardware and application logic. The application logic, software or an instruction set is maintained on any one of various conventional computer-readable media. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the afore-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications which may be made without departing from the scope of the present invention as defined in the appended claims.

The invention claimed is:

1. A method comprising:
   receiving at a user equipment (UE's) home network access network selection information concerning a pending session the UE seeks to establish with an other network;
   determining whether the other network and/or the pending session complies with the home network's access network selection policy, and only if not the home network either:
   rejecting the pending session, or allowing the pending session with at least one of increased charges, reduced data rate and degraded quality.

2. The method of claim 1, wherein the access network information comprises information indicating at least one of a service and/or a service type requested by the UE for the pending session.

3. The method of claim 2, comprising:
   the determining comprises determining whether the requested service and/or service type complies with the home network access network selection policy.

4. The method of claim 1, comprising:
receiving said home network access network selection information in response to asking.

5. The method of claim 1, wherein the determining comprises querying a policy repository.

6. The method of claim 1, comprising:
sending towards user equipment an indication that the pending session is rejected or is allowed with at least one of the increased charges, reduced data rate and degraded quality.

7. The method of claim 1, comprising:
performing policy enforcement concerning the pending session based on the determining.

8. The method of claim 1, wherein the home network access network selection information comprises location information corresponding to the UE.

9. The method of claim 8, comprising:
performing location-dependent policy enforcement concerning the pending session based on the determining.

10. The method of claim 1, comprising:
having access networks in a priority list, and accepting, modifying or rejecting the pending session based on priority of the other network within the priority list.

11. An apparatus comprising:
a communication interface configured to receive a user equipment (UE's) home network access network selection information concerning a pending session the UE seeks to establish with an other network;
a first processor configured with a memory storing program code that when executed causes the apparatus to determine whether the other network and/or the pending session complies with the home network's access network selection policy and only if not either:
reject the pending session, or allow the pending session with at least one of increased charges, reduced data rate and degraded quality.

12. The apparatus of claim 11, wherein the access network information comprises information indicating at least one of a service and/or a service type requested by the UE for the pending session.

13. The apparatus of claim 12, wherein the apparatus is configured to determine whether the requested service and/or service type complies with the home network access network selection policy.

14. The apparatus of claim 11, wherein the apparatus is configured to receive said home network access network selection information in response to asking.

15. The apparatus of claim 11, wherein the apparatus is configured to determine as said by querying a policy repository.

16. The apparatus of claim 11, wherein the apparatus is configured to send the UE an indication that the pending session is rejected or is allowed with at least one of the increased charges, reduced data rate and degraded quality.

17. The apparatus of claim 11, wherein the apparatus is configured to perform policy enforcement concerning the pending session based on the determination.

18. An apparatus comprising:
a communication interface configured to receive compliance information indicating that a pending session a user equipment (UE) seeks to establish with an other network, and/or the other network, does not comply with a network selection access policy of the UE's home network; and
a user interface configured to display in response an indication that the pending session is either rejected, or the pending session is allowed with at least one of increased charges, reduced data rate and degraded quality.

19. The apparatus according to claim 18, wherein the UE comprises the apparatus.

* * * * *

UNITED STATES PATENT AND TRADEMARK OFFICE
CERTIFICATE OF CORRECTION

| | |
|---|---|
| PATENT NO. | : 9,521,005 B2 |
| APPLICATION NO. | : 14/440587 |
| DATED | : December 13, 2016 |
| INVENTOR(S) | : Sami Kekki |

It is certified that error appears in the above-identified patent and that said Letters Patent is hereby corrected as shown below:

In the Claims

In Claim 3:
Column 12, Line 64, "comprising" should be deleted.

Signed and Sealed this
Fourteenth Day of February, 2017

Michelle K. Lee
*Director of the United States Patent and Trademark Office*